United States Patent
Schoepflin et al.

(10) Patent No.: US 6,574,353 B1
(45) Date of Patent: Jun. 3, 2003

(54) VIDEO OBJECT TRACKING USING A HIERARCHY OF DEFORMABLE TEMPLATES

(75) Inventors: Todd Schoepflin, Seattle, WA (US); Vikram Chalana, Bothell, WA (US); David Haynor, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/500,403

(22) Filed: Feb. 8, 2000

(51) Int. Cl.$^7$ .................................................. G06K 9/00
(52) U.S. Cl. ........................ 382/103; 382/199; 382/215; 382/236; 348/169
(58) Field of Search .................................. 382/103, 107, 382/236, 215; 348/169, 413.1, 414.1, 416.1, 417.1

(56) References Cited

U.S. PATENT DOCUMENTS

| | | | |
|---|---|---|---|
| 4,906,940 A | | 3/1990 | Greene et al. |
| 5,280,530 A | * | 1/1994 | Trew et al. .................. 382/103 |
| 5,999,651 A | * | 12/1999 | Chang et al. ............... 382/215 |

OTHER PUBLICATIONS

Kevrann, c.; "A Hierarchical Markov Modeling Approach for the Segmentation and Tracking of Deformable Shapes," Graphical Models and Image Processing vol. 60 No. 3 May 1998, pp 173–195.

Jain, A.; "Object Matching Using Deformable Templates," IEEE Trans on Pattern Analysis and Mahine Intelligence, vol. 18 No. 3 Mar. 1996.

Meyer et al.; "Region–Based Tracking Using Affine Motion Models in Long Image Sequences," Image Understanding vol. 60 No. 2 9/94 pp 119–140.

Zhong et al.; "Object Tracking Using Deformable Templates," 6th Int'l Conf. on Computer Vision (India) 1/98.

Singh et al. "Comparison of Daubechies, Coiflet and Symlet for Edge Detection" SPIE vol. 3074; 1997.

Amini et al., "Using dynamic Programming for Sloving Variational Problems in Vision;" IEEE Trans on Pattern Analysis and Machine Intelligence V12 n9 9/90.

Fujimara et al.; Motion Tracking of Deformable Objects Based on Energy Minimization Using Multiscale Dynamic Programming 8186–2190 IEEE 1992.

Kakadiaris et al.; "Inferring 2D Object Structure from the Deformation of Apparent Contours;" Computer Vision and Image Understanding V65 n2 2/97.

Kass et al.; "Snakes: Active Contour Models;" Int'l Journal of Computer Vision pp 321–331; 1988.

Lai et al.; "Deformable Contours: Modeling and Extraction," IEEE Transaction on Pattern Analysis and Machine Intelligence, V17, n11, 11/95.

(List continued on next page.)

Primary Examiner—Jon Chang
Assistant Examiner—Charles Kim
(74) Attorney, Agent, or Firm—Steve Koda, Esq.

(57) ABSTRACT

A hierarchy of deformation operations is implemented to deform a template and match the deformed template to an object in a video frame. At each level, the constraints on the template deformations are relaxed, while the spatial range of the object boundary search is narrowed. At a highest level, an initial template is translated, rotated and scaled to coarsely locate the object within a given image frame. At a middle level, an affine transformation is implemented, globally or locally, to deform the template. For a local affine transformation process, a sup-portion, such as an articulation or appendage portion of the template is deformed. The middle level refines the template to get the template boundary close to the actual object boundary within a given frame. At the lowest level, a local segmentation algorithm is applied to deform the now close boundary to finely match the object boundary.

22 Claims, 5 Drawing Sheets

OTHER PUBLICATIONS

Leymarie et al.; "Tracking Deformable objects in the Plane Using an Active Contour Model," IEEE Trans on Pattern Analaysis & Mach Int V15 n6 6/93.

Terzopouliis et al.; "Deformable Models," The Visual Computer, Springer–Verlag 1998.

Yuille et al.; "Feature Extraction from Faces Using Deformable Templates," Int'l Journal of Computer Vision 8:2 pp 99–111; 1992.

Staib et al.; "Boundary Finding with Parametrically Deformable Models," IEEE Trans on Pattern Analysis and Machine Int. V14, n11; 11/92.

Blake et al.; "A Framework for Spatiotemporal Control in the Tracking of Visual Contours," Int'l Journal of Computer Vision 11:2, pp127–145; 1993.

* cited by examiner

FIG.4A
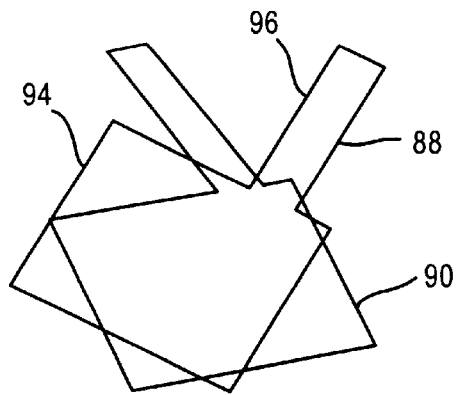
FIG.4B
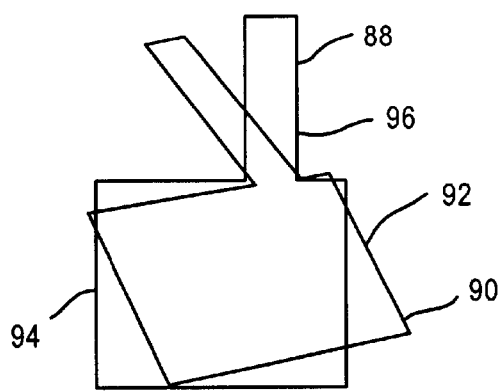
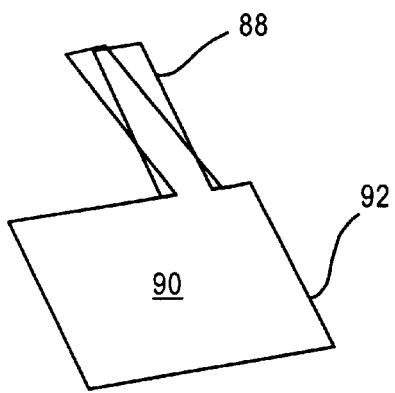
FIG.4C
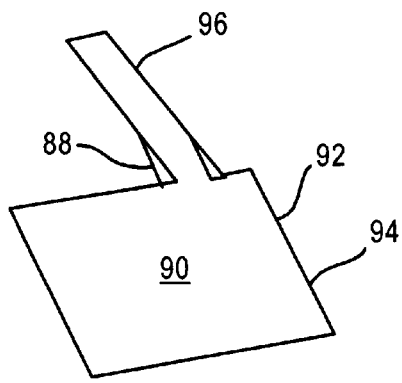
FIG.4D
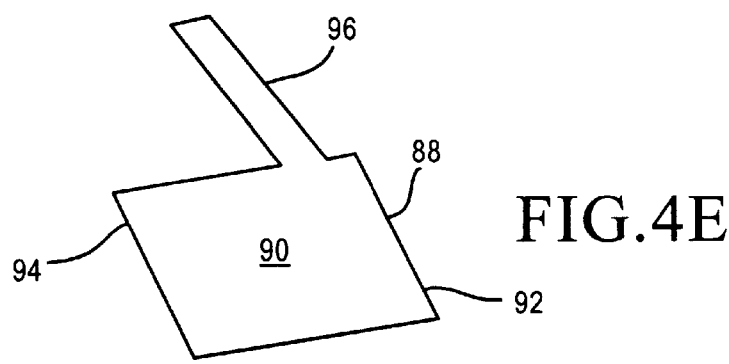
FIG.4E

VIDEO OBJECT TRACKING USING A HIERARCHY OF DEFORMABLE TEMPLATES

BACKGROUND OF THE INVENTION

This invention relates to object tracking within a sequence of image frames, and more particularly to methods and apparatus for tracking an object using deformable templates.

When tracking an object among multiple frames of a video sequence, the object boundary is identified in each frame. The object is the area within the boundary. The challenge in identifying the object boundary in a given frame increases as the constraints on a trackable object are relaxed to allow tracking an object which translates, rotates or deforms. Once the object is identified in one frame, template matching may be used in a subsequent frame to detect translation of the object. The template typically is the object as identified in the prior frame. Deformable models are used to detect objects which translate, rotate or deform. Various methods using deformable models are described below.

Active contour models, also known as snakes, have been used for adjusting image features, in particular image object boundaries. In concept, active contour models involve overlaying an elastic curve onto an image. The curve (i.e., snake) deforms itself from an initial shape to adjust to the image features. An energy minimizing function is used which adapts the curve to image features such as lines and edges. The function is guided by external constraint forces and image forces. The best fit is achieved by minimizing a total energy computation of the curve. In effect, continuity and smoothness constraints are imposed to control deformation of the model. The model is the object from a prior frame. A shortcoming of the active contour model is that small changes in object position or shape from one frame to the next may cause the boundary identification to fail. In particular, rather than following the object, the estimated boundary instead latches onto strong false edges in the background, distorting the object contour. Yuille et al. in "Feature Extraction from Faces Using Deformable Templates," International Journal of Computer Vision, Vol. 8, 1992, disclose a process in which eyes and mouths in an image are identified using a model with a few parameters. For example, an eye is modeled using two parabolas and a circle radius. By changing the shape of the parabolas and the circle radius, eyes can be identified. Yuille et al. and other deformation models typically have encompassed only highly constrained deformations. In particular, the object has a generally known shape which may deform in some generally known manner. Processes such as an active contour model have relaxed constraints, but are only effective over a very narrow spatial range of motion. Processes like that disclosed by Yuille are effective for a wider spatial range of motion, but track a very constrained type of motion. Accordingly, there is a need for a more flexible and effective object tracker, which can track more active deformations over a wider spatial range.

SUMMARY OF THE INVENTION

According to the invention, a hierarchy of deformation operations are implemented to deform a template and match the deformed template to an object in a video frame. The hierarchical deformation and matching is performed in multiple frames to track the object among such frames. At each level of the hierarchical processing, the constraints on the template deformations are relaxed, while the spatial range of the object boundary search is more confined.

For a given image frame, an edge energy analysis is performed to derive an edge energy representation of the image frame. Such representation includes an energy representation of the object boundary along with energy representations of other edges present in the image frame. When searching a frame to identify the location of the object, it is the energy representation which is searched using the hierarchy of deformation operations.

In a preferred embodiment, three levels of deformation and tracking are implemented. At a highest level, an initial template used for a current image frame is translated and rotated to coarsely locate the object boundary among the energy representation of the image frame, and thus, located the object within the given image frame. In some embodiments scaling also is performed at the highest level.

According to an aspect of this invention, at a middle level, an affine transformation is implemented to deform the template. In the affine transformation, lines of the template border are rotated or expanded. For example, parallel lines are rotated or expanded to vary distances between points on the lines, while maintaining the lines in parallel. For example, a global affine deformation operation is applied to the template.

According to another aspect of the invention, in addition or alternatively, the middle level includes a local affine transformation process in which an affine transformation is applied to a local sub-portion of the template. The sub-portions are selected or preselected by an operator. For example, when an object is selected to be tracked, the sub-portions are selected by the operator with the object. The sub-portions, in effect, are articulating portions of the object. For example, when the object is a body, the operator may select one or more appendages to be the articulations tracked. The appendages are the selected the sub-portions of the template. In another example the object is a car and the articulating sub-portion is a door. In yet another example, the object is a tree and the articulating sub-portion is a branch of the tree.

This middle level of deforming and tracking is used for adjusting the translated, rotated and/or scaled template to allow for moving articulations within the object. Specifically the constraints on trackable object motions are relaxed to encompass articulated motion of appendages or other sub-portions of an object. The middle level refines the template to get the template boundary close to the actual object boundary for the given image frame. Like in the high level process, the deformed template is compared to the energy representation of the image frame to improve an estimate of the object boundary location.

At the lowest level, a local segmentation algorithm is applied in a preferred embodiment to deform the now close boundary to finely match the object boundary. At the lowest level the allowed deformations of the object are the least constrained. However, such motions may occur in a more limited spatial range than for the middle level process or the high level process.

In various embodiments, the middle level deformation process(es) are performed alone, or with the high level deformation and/or low level deformation processes. Further, various low level deformation processes may be included, such as an active contour model or another local segmentation algorithm.

According to an advantage of this invention, an accurate boundary of an object is tracked for objects which deform or include rapidly moving sub-portions. The ability to track a wide variety of object shapes and differing object deformation patterns is particularly beneficial for use with MPEG-4 image processing systems.

These and other aspects and advantages of the invention will be better understood by reference to the following detailed description taken in conjunction with the accompanying drawings.

BRIEF DESCRIPTION OF THE DRAWINGS

FIGS. 4A–4E are illustrations of a sample template being deformed according to the hierarchy of deformations to estimate location of an object in a given image frame.

DESCRIPTION OF SPECIFIC EMBODIMENTS

Overview

Figure 1:
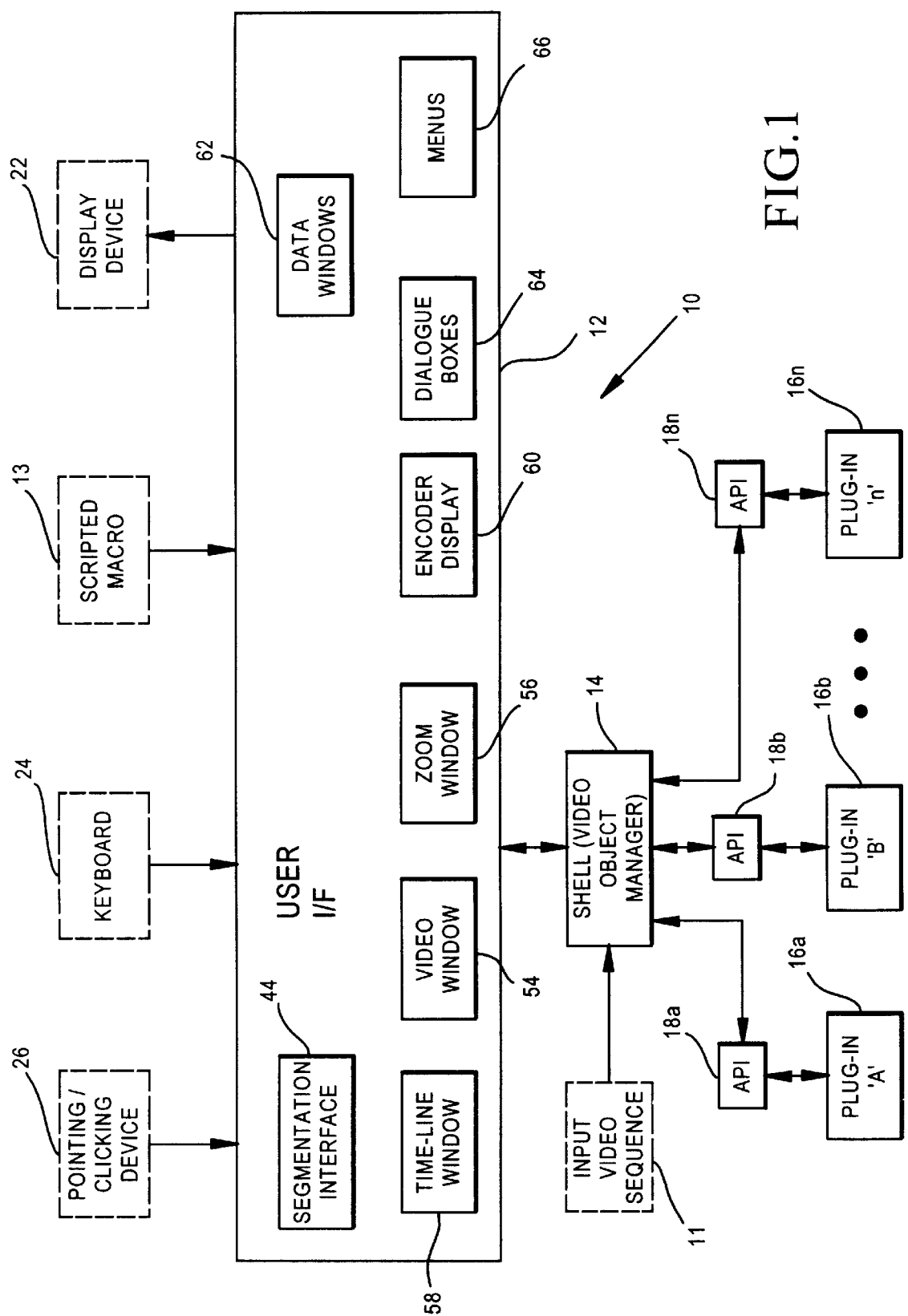
FIG. 1 is a block diagram of an interactive processing environment for tracking video objects among a sequence of video frames.

FIG. 1 shows a block diagram of an interactive processing environment 10 for locating, tracking and encoding video objects. The processing environment 10 includes a user interface 12, a shell environment 14 and a plurality of functional software 'plug-in' programs 16. The user interface receives and distributes operator inputs from various input sources, such as a point and clicking device 26 (e.g., mouse, touch pad, track ball), a key entry device 24 (e.g., a keyboard), or a prerecorded scripted macro 13. The user interface 12 also controls formatting outputs to a display device 22. The shell environment 14 controls interaction between plug-ins 16 and the user interface 12. An input video sequence 11 is input to the shell environment 14. Various plug-in programs 16a–16n may process all or a portion of the video sequence 11. One benefit of the shell 14 is to insulate the plug-in programs from the various formats of potential video sequence inputs. Each plug-in program interfaces to the shell through an application program interface ('API') module 18.

Figure 2:
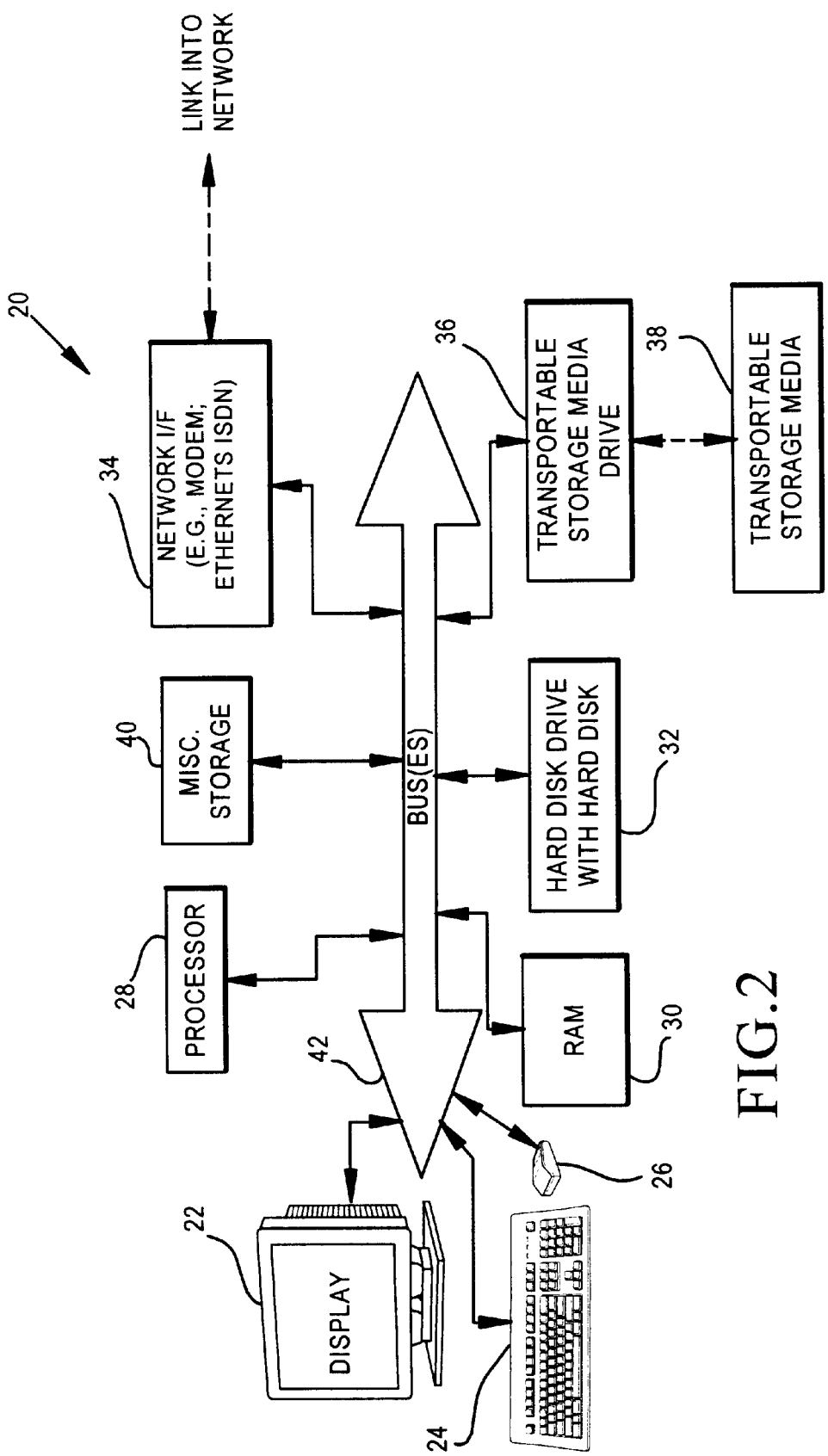
FIG. 2 is a block diagram of an exemplary host computing system for the interactive processing environment of FIG. 1.

In one embodiment the interactive processing environment 10 is implemented on a programmed digital computer of the type which is well known in the art, an example of which is shown in FIG. 2. A computer system 20 has a display 22, a key entry device 24, a pointing/clicking device 26, a processor 28, and random access memory (RAM) 30. In addition there commonly is a communication or network interface 34 (e.g., modem; ethernet adapter), a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more buses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer, a networked client computer or a stand alone computer. The computer system 20 may even be configured as a workstation ; personal computer, or a reduced-feature network terminal device.

In another embodiment the interactive processing environment 10 is implemented in an embedded system. The embedded system includes similar digital processing devices and peripherals as the programmed digital computer described above. In addition, there are one or more input devices or output devices for a specific implementation, such as image capturing.

Software code for implementing the user interface 12 and shell environment 14, including computer executable instructions and computer readable data are stored on a digital processor readable storage media, such as embedded memory, RAM, ROM, a hard disk, an optical disk, a floppy disk, a magneto-optical disk, an electro-optical disk, or another known or to be implemented transportable or non-transportable processor readable storage media. Similarly, each one of the plug-ins 16 and the corresponding API 18, including digital processor executable instructions and processor readable data are stored on a processor readable storage media, such as embedded memory, RAM, ROM, a hard disk, an optical disk, a floppy disk, a magneto-optical disk, an electro-optical disk, or another known or to be implemented transportable or non-transportable processor readable storage media. The plug-ins 16 (with the corresponding API 18) may be bundled individually on separate storage media or together on a common storage medium. Further, none, one or more of the plug-ins 16 and the corresponding API's 18 may be bundled with the user interface 12 and shell environment 14. Further, the various software programs and plug-ins may be distributed or executed electronically over a network, such as a global computer network.

Under various computing models, the software programs making up the processing environment 10 are installed at an end user computer or accessed remotely. For stand alone computing models, the executable instructions and data may be loaded into volatile or non-volatile memory accessible to the stand alone computer. For non-resident computer models, the executable instructions and data may be processed locally or at a remote computer with outputs routed to the local computer and operator inputs received from the local computer. One skilled in the art will appreciate the many computing configurations that may be implemented. For non-resident computing models, the software programs may be stored locally or at a server computer on a public or private, local or wide area network, or even on a global computer network. The executable instructions may be run either at the end user computer or at the server computer with the data being displayed at the end user's display device.

Shell Environment and User Interface

The shell environment 14 allows an operator to work in an interactive environment to develop, test or use various video processing and enhancement tools. In particular, plug-ins for video object segmentation, video object tracking and video encoding (e.g., compression) are supported in a preferred embodiment. The interactive environment 10 with the shell 14 provides a useful environment for creating video content, such as MPEG-4 video content or content for another video format. A pull-down menu or a pop up window is implemented allowing an operator to select a plug-in to process one or more video frames.

According to a preferred embodiment the shell 14 includes a video object manager. A plug-in program 16, such as a segmentation program accesses a frame of video data, along with a set of user inputs through the shell environment 14. A segmentation plug-in program identifies a video object within a video frame. The video object data is routed to the shell 14 which stores the data within the video object manager module. Such video object data then can be accessed by the same or another plug-in 16, such as a tracking program. The tracking program identifies the video object in subsequent video frames. Data identifying the video object in each frame is routed to the video object manager module. In effect video object data is extracted for each video frame in which the video object is tracked. When an operator completes all video object extraction, editing or filtering of a video sequence, an encoder plug-in 16 may be activated to encode the finalized video sequence into a desired format. Using such a plug-in architecture, the segmentation and tracking plug-ins do not need to interface to the encoder plug-in. Further, such plug-ins do not need to support reading of several video file formats or create video output formats. The shell handles video input compatibility issues, while the user interface handles display formatting issues. The encoder plug-in handles creating a run-time video sequence.

For a Microsoft Windows operating system environment, the plug-ins 16 are compiled as dynamic link libraries. At processing environment 10 run time, the shell 14 scans a predefined directory for plug-in programs. When present, a plug-in program name is added to a list which is displayed in a window or menu for user selection. When an operator selects to run a plug-in 16, the corresponding dynamic link library is loaded into memory and a processor begins executing instructions from one of a set of pre-defined entry points for the plug-in. To access a video sequence and video object segmentations, a plug-in uses a set of callback functions. A plug-in interfaces to the shell program 14 through a corresponding application program interface module 18.

In addition, there is a segmentation interface 44 portion of the user interface 12 which is supported by a segmentation plug-in. The segmentation interface 44 makes calls to a segmentation plug-in to support operator selected segmentation commands (e.g., to execute a segmentation plug-in, configure a segmentation plug-in, or perform a boundary selection/edit).

The API's 18 typically allow the corresponding plug-in to access specific data structures on a linked need-to-access basis only. For example, an API serves to fetch a frame of video data, retrieve video object data from the video object manager, or store video object data with the video object manager. The separation of plug-ins and the interfacing through API's allows the plug-ins to be written in differing program languages and under differing programming environments than those used to create the user interface 12 and shell 14. In one embodiment the user interface 12 and shell 14 are written in C++. The plug-ins can be written in any language, such as the C programming language.

In a preferred embodiment each plug-in 16 is executed in a separate processing thread. As a result, the user interface 12 may display a dialog box that plug-ins can use to display progress, and from which a user can make a selection to stop or pause the plug-in's execution.

Referring again to FIG. 1, the user interface 12 includes the segmentation interface 44 and various display windows 54–62, dialogue boxes 64, menus 66 and button bars 68, along with supporting software code for formatting and maintaining such displays. In a preferred embodiment the user interface is defined by a main window within which a user selects one or more subordinate windows, each of which may be concurrently active at a given time. The subordinate windows may be opened or closed, moved and resized.

In a preferred embodiment there are several subordinate windows 52, including a video window 54, a zoom window 56, a time-line window 58, one or more encoder display windows 60, and one or more data windows 62. The video window 54 displays a video frame or a sequence of frames. For viewing a sequence of frames, the frames may be stepped, viewed in real time, viewed in slow motion or viewed in accelerated time. Included are input controls accessible to the operator by pointing and clicking, or by predefined key sequences. There are stop, pause, play, back, forward, step and other VCR-like controls for controlling the video presentation in the video window 54. In some embodiments there are scaling and scrolling controls also for the video window 54.

The zoom window 56 displays a zoom view of a portion of the video window 54 at a substantially larger magnification than the video window. The time-line window 58 includes an incremental time-line of video frames, along with zero or more thumb nail views of select video frames. The time line window 58 also includes a respective time-line for each video object defined for the input video sequence 11. A video object is defined by outlining the object.

The data window 62 includes user-input fields for an object title, translucent mask color, encoding target bit rate, search range and other parameters for use in defining and encoding the corresponding video object.

During encoding one of the encoder windows 60 is displayed. For example, an encoder progress window shows the encoding status for each defined video object in the input video sequence 11.

Video Object Tracking

To track an object, the first step is to define a template to use which corresponds to the object. In a preferred embodiment an operator loads in an input video sequence and selects points or line segments approximating a boundary of the object. A local segmentation algorithm then is applied to more accurately define the boundary. The operator may adjust points on the boundary to refine the boundary, and re-execute the segmentation algorithm using the refined boundary points to achieve a desired and accurate object. Such object serves as an initial template for locating the object in another frame.

In a preferred embodiment, the located object in a given frame serves as the initial template when searching for the object in the next frame to be processed. Such next frame may be the succeeding image frame in the video sequence, or the next frame to be sampled in the video sequence, or any other frame, either in sequence or out of sequence, which is the next frame to be processed. According to such preferred approach the initial template is always changing for each frame to be processed. In an alternative approach, the selected object serves as the initial template for locating the object in every frame to be processed.

Figure 3:
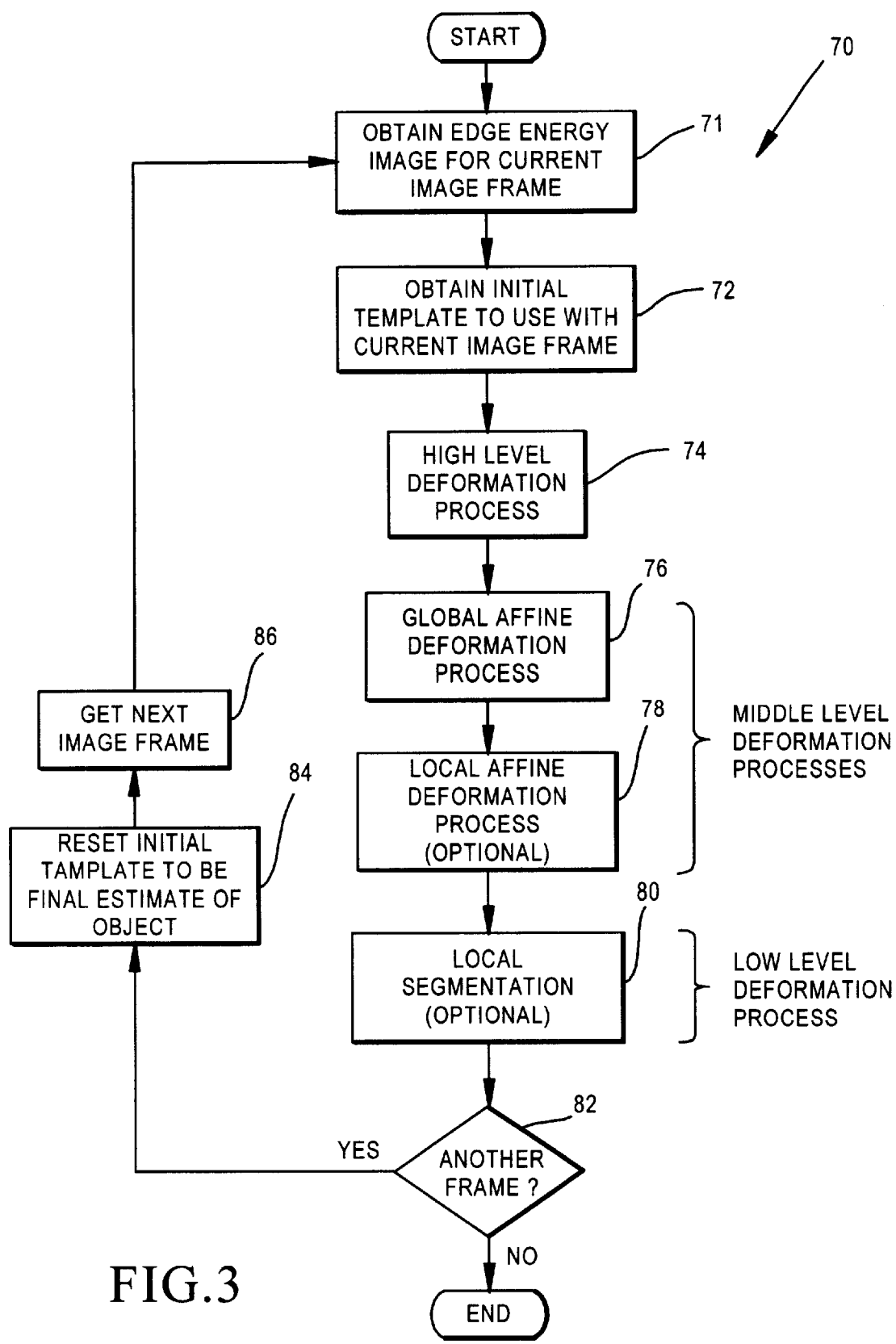
FIG. 3 is a flow chart of a method of applying a hierarchy of deformations to a template to track an object among a plurality of image frames according to an embodiment of this invention.

Referring to FIG. 3, a flow chart 70 of a hierarchical tracking methodology is shown for an embodiment of this invention. At the entry point, the object to be tracked has already been selected by the operator. In addition a segmentation algorithm has been applied to accurately depict the object boundary and store a template of the object, including the object boundary. Any of various known segmentation algorithms, (e.g., an active contour model) are used to identify the template of the object.

At step 71 of the hierarchical tracking method a current image frame among a plurality of image frames is processed to obtain an edge energy representation of the image frame. In one embodiment a Canny edge detection algorithm generates a binary image representation of an image's edges, (e.g., pixels on edge =1; pixel's not on edge=0). A distance transform then is applied to the binary image to obtain the energy image. In another embodiment, a wavelet decomposition algorithm is implemented to define the edge energy representation. With color image frames the wavelet decomposition algorithm is preferred. A Canny edge detector algorithm is described in "A Computational Approach to Edge Detection," by John Canny, IEEE Transactions on Pattern Analysis and Machine Intelligence, PAMI-8(6), 1986, pages 679–698. A wavelet decomposition algorithm is described in "Comparison of Daubechies, Coiflet, and Symlet for Edge Detection," by Singh et al., SPIE Vol. 3074; 0277–786X; 1997. Another wavelet decomposition algorithm is described in commonly-assigned U.S. patent application Ser. No. 09/323,501 filed Jun. 10, 1999 naming Sun et al. titled, "Video Object Segmentation Using Active Contour Model with Global Relaxation."

At step 72, an initial template for the current image frame being processed is obtained. As described above, the initial template preferably is the final object boundary estimate as located in a prior frame, and changes for each frame processed.

Referring to FIG. 4A, an initial template 88 is applied to an edge energy representation 90 of an image frame. Although the edge energy representation 90 is shown only with edges for the object corresponding to the template, typically there are many edges. The tracking method is to select the edges that correspond to the object desired to be tracked.

In a preferred embodiment the template is define parametrically or explicitly.

For example in one embodiment the template is defined by a set of explicit (x,y) coordinate pairs. The template is deformed to minimize some energy metric. In general, the total energy of the template is the sum of internal template strains and external energy from the current image frame. Other than for the local segmentation steps, the internal energy does not contribute to the total energy. This is because in the local segmentation algorithm (having the least deformation constraints) all deformations within the given set of constraints are equally valid. Typically, the external energy is defined as an integral of the energy image around a contour $\Omega$. Discretization occurs by summation over the pixels on the template boundary.

$$E_{ext} = \int_\Omega E(s)\,ds \cong \sum_{(x,y)\in\Omega} E(x_i, y_i)$$

At step 74, a high level template deformation process is executed to coarsely locate the object in the current frame being processed. During such step 74 the template is deformed using a first set of deformation constraints. A boundary 92 of the object in the frame is searched for by comparing deformations of the template 88 with the content of the image frame. In a preferred embodiment, the deformations are compared to the edge energy representation 90 of the image frame. The deformations of the template are allowed to occur over a first spatial range. In particular, a large spatial range is desired to coarsely locate the object.

In a preferred embodiment the first set of deformation constraints treat the object as a rigid body which may be translated, rotated or rescaled in an image frame. The first spatial range includes the entire image frame. In particular, a boundary of the template can be moved anywhere in the image frame to find a corresponding boundary on the object. The types of movements are determined by the first set of deformation constraints (e.g., translation, rotation and scaling). In a specific embodiment the template is translated and rotated through a discrete set of positions and orientations. In addition, the template is scaled through a discrete set of scaling variations. In various embodiments the coarse analysis encompasses any one or more of translational, rotational and scaled permutations. By choosing the lowest energy point among these positions, orientations and scalings, an appropriate local energy minimum is found within a prescribed search space (i.e., the first spatial range). The search ends when the template energy is minimal at a central position of a prescribed window size, (e.g., 5×5, although other sizes may be used).

Referring to FIG. 4B, the template 88 is shown having been rotated, translated and/or scaled to obtain the closest match with a set of edges in the energy representation 90. Through repeated iterations within the high level template deformation process, a coarse estimate of the object boundary 92 and location is achieved. The coarse estimate is the deformed template. The template 88 after completion of the high level deformation process is referred to as the first deformed template.

At step 76 a middle level deformation process is executed to more closely locate the object in the current frame being processed. During such step 76 the first deformed template 88 is deformed using a second set of deformation constraints. The second set of deformation constraints are more relaxed than the first set of deformation constraints. A boundary 92 of the object in the frame is searched for by comparing deformations of the first deformed template with the energy content of the image frame. In a preferred embodiment, the deformations are compared to the edge energy representation 90 of the image frame. The deformations of the first deformed template are allowed to occur over a second spatial range. The second spatial range is narrower than the first spatial range. In particular, a smaller spatial range than used in the high level deformation process is desired to more closely locate the object. Through repeated iterations, an improved estimate of the object boundary and location is achieved. The improved estimate is the final deformation of the first deformed template. The first deformed template has undergone deformations during the middle level deformation process leading to what is referred to herein as the second deformed template.

In one embodiment the second set of deformation constraints limit the deformations to affine deformations. In a preferred embodiment a global affine transformation is applied to the first deformed template to add further deformations in step 76. The second spatial range limits the affine deformation range. Referring to FIG. 4C the first deformed template is skewed using a global affine transformation to obtain a closest match to edges in the edge energy representation 90 of the image frame. Through repeated iterations within the global affine deformation process, an improved estimate of the object boundary 92 and location is achieved.

In the global affine deformation process a transformation is applied to each pixel of the template boundary using a common affine matrix. The affine matrix is global in the sense that it is applied to each pixel on the boundary using the same affine matrix equation. (The local affine deformation process uses the same affine matrix equation, but applied to a local sub-portion of the template. In one embodiment the matrix equation is:

$$\begin{bmatrix} x' \\ y' \end{bmatrix} = \begin{bmatrix} a_{11} & a_{12} \\ a_{21} & a_{22} \end{bmatrix} \begin{bmatrix} x \\ y \end{bmatrix} + \begin{bmatrix} t_x \\ t_y \end{bmatrix} + \begin{bmatrix} x_c \\ y_c \end{bmatrix}$$

where x' and y' are the new coordinates, x and y are the coordinates $x_0 y_0$ with the mean value $x_c$ and $y_c$ removed, respectively, (e.g., $x_0 = x + x_c$). The 'a' matrix defines a scaling, rotation, and shearing of the template about its centroid ($x_c$, $y_c$). Parameters $t_x$, $t_y$ provide additional translation. The algorithm uses a gradient descent search to determine these parameters. The gradient descent search is described below in a separate section. Although rotation and translation can occur during both the discrete search (i.e., high level deformation process) and the global affine deformation process the spatial range is more confined for the global affine deformation process. Specifically, the minima in the edge energy image within which the global affine may be deformed is localized to a band surrounding the true edge. The high level deformation process positions the template within such band so that the gradient descent search may proceed.

In some embodiments, a local affine deformation step 78 also is applied as part of a middle level deformation process. In a local affine deformation process a sub-portion of the template is deformed using an affine transformation algorithm. Preferably, an operator selects articulating portions of the object when the object is initially defined by the operator. Such articulating portions are sub-portions of the initial template. With the deformations applied during the high level deformation process, the articulating portions are coarsely defined in the first deformed template. It is these sub-portions which are deformed locally using a local affine transformation algorithm. Some objects may not have sub-portions identified by the operator. Also some objects may be classified as rigid objects. In such cases, the local affine deformation step 78 is omitted.

Referring to FIG. 4D the template 88 includes a main portion 94 and a sub-portion 96. During the local affine deformation process one or more sub-portions are deformed independently of the other sub-portions (without breaking apart the template). In the example illustrated the sub-portion 96 is skewed in part. Through repeated iterations within the local affine deformation process, an improved estimate of the object boundary 92 in the vicinity of the sub-portion 96 is achieved.

In one embodiment the local affine deformation process uses the same algorithm as the global affine transformation process. In the local process, the algorithm is applied to a sub-portion of the template, instead of to the entire template. For a local affine deformation of multiple sub-portions, the algorithm is applied independently to each such sub-portion. In a sense a sub-portion is treated as a template and deformed using the same affine deformation algorithm.

Through repeated iterations of the global affine transformation process at step 76, and optionally, repeated iterations of the local affine transformation process at step 78, an improved estimate of the object boundary and location is achieved. The improved estimate is the final template after all the middle level deformations are applied to the first deformed template. Specifically, the first deformed template has undergone deformations during the middle level deformation processes leading to what is referred to herein as a second deformed template.

At step 80 a low level deformation process is executed to refine the estimated location and boundary 92 of the object in the current frame being processed. During such step 80 the second deformed template is deformed using a third set of deformation constraints. The third set of deformation constraints are more relaxed than the second set of deformation constraints. Referring to FIG. 4E, the boundary 92 of the object in the frame is searched for by comparing deformations of the second deformed template 88 with the energy content 90 of the image frame. In a preferred embodiment, the deformations are compared to the edge energy representation 90 of the image frame.

The deformations of the second deformed template are allowed to occur over a third spatial range. The third spatial range is narrower than the second spatial range. In particular, a smaller spatial range than used in the middle level deformation process is desired to precisely locate the object. Through repeated iterations, an improved estimate of the object boundary and location is achieved. The improved estimate is the final deformation of the second deformed template. The second deformed template has undergone deformations during the low level deformation process leading to what is referred to herein as the third deformed template. The third deformed template is the final estimate of the object boundary and location in the current image frame. In some embodiment the low level deformation process of step 80 is omitted.

In a preferred embodiment the low level deformation process is a local segmentation process. As a result, the template boundary is allowed to deform in a varied manner. For example, for an embodiment in which an active contour model is used as the local segmentation algorithm a desire for border smoothness and continuity are the only shape deformation constraints. Accordingly, these constraints are more relaxed than the affine transformation constraints and the translation, rotation, scaling constraints. Although the border shape can vary greatly, the area within which the variation may occur is more limited to a narrow range. This is so that the low level deformation processing is to adjust the border at local areas to precisely match the object border. To be more specific the template border is moved closer to a nearest edge of the edge energy representation of the image frame. In effect, an edge is selected from among the edges culled from the image frame to precisely define the estimate of the object boundary.

In some instances, the operator may indicate that the object being tracked is a rigid body. As a result, local segmentation is disabled. In some embodiments the operator selects whether to perform the local segmentation process.

In one embodiment the local segmentation process is an active contour model.

In another embodiment a simpler edge-based method is implemented in which control points are used. The control points are initially selected by the operator when the object to be tracked is first identified. The control points may move during the high level and middle level deformation processes, but are fixed during this embodiment of the low level deformation process. The control points are connected using dynamic programming, such as a segmentation algorithm, which minimizes the sum of the edge energy along the path between control points. In effect, an edge detection algorithm connects these fixed control points using an edge detection scheme (e.g., image contrast thresholds) to trace a curve from one control point to another.

At step 82, the sequence of image frames is tested to determine if there are any more image frames to process. If not, then the process is complete. If there are more image frames to process, then at step 84 the third deformed template, (i.e., the final estimate of the object boundary and location for the current image frame) is set to be the initial template for the next frame. At step 86 the next image frame to be processed is retrieved. The steps 71–82 then are repeated for such next frame—which is now the current image frame being processed.

An advantage of the hierarchical approach described herein is that increased variability in the object border shape and object motion are accommodated by executing the hierarchical set of deformation processes. In each descending level the shape constraints are loosened and the spatial constraints within which the shape variations can occur are tightened (i.e., narrowed, more confined).

Gradient Descent Search Strategy

Figure 5:
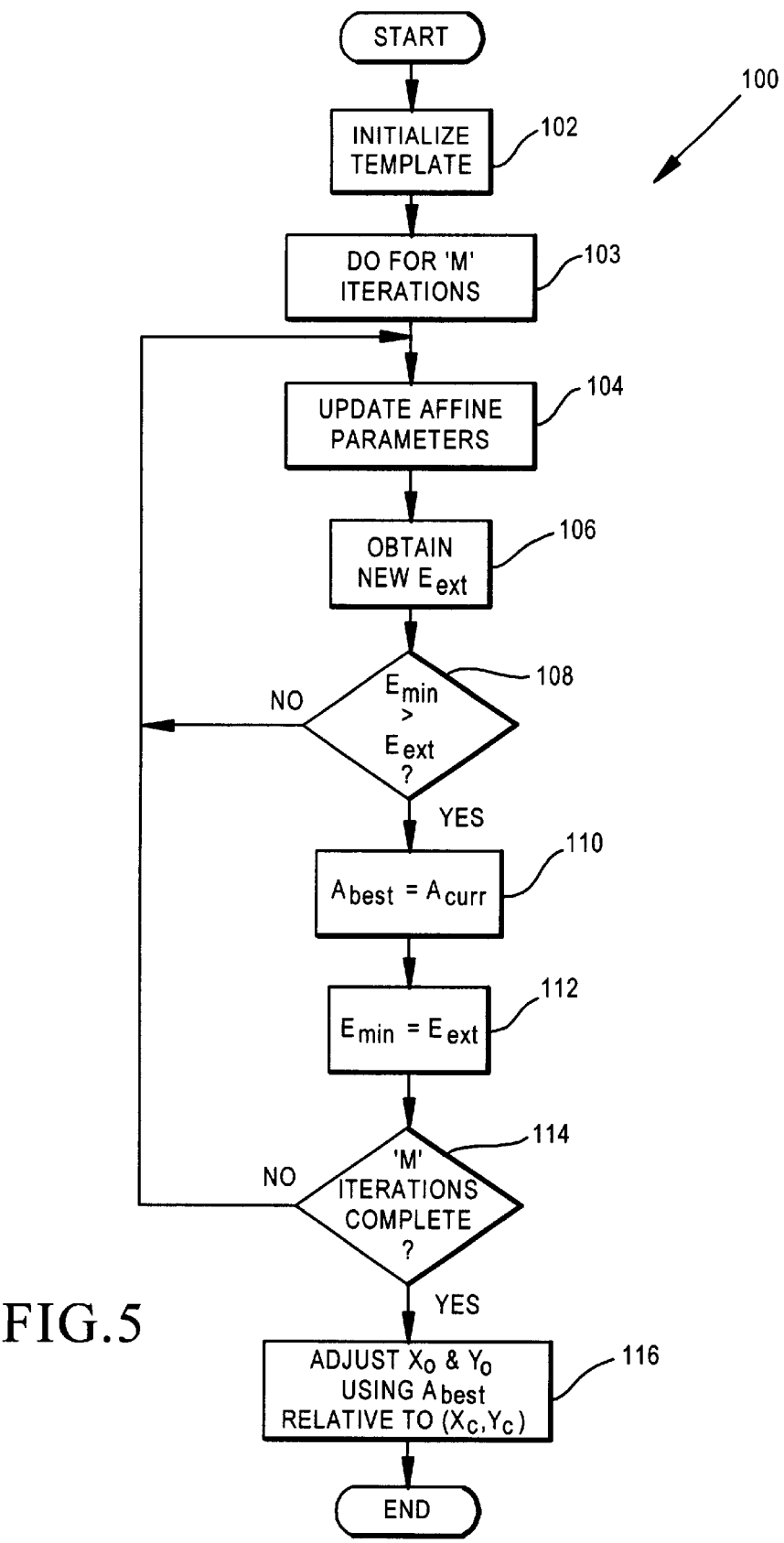
FIG. 5 is a flow chart of a global descent strategy for applying affine deformations to a template to estimate location of the object in a given image frame.

Referring to FIG. 5, a flow chart 100 of the gradient descent search process is shown. At step 102 the template 88 is initialized for the search. The template is the first deformed template when performing a global affine deformation process, and is a select sub-portion of the second deformed template when performing a local affine deformation process. The select sub-portion is the local area upon which the affine transformation is to be applied.

For each given frame N, it is assumed that each pixel coordinate (x, y) undergoes affine motion according to the equation:

$$\begin{bmatrix} x' \\ y' \end{bmatrix} = \begin{bmatrix} a_{11} & a_{12} \\ a_{21} & a_{22} \end{bmatrix} \begin{bmatrix} x \\ y \end{bmatrix} + \begin{bmatrix} t_x \\ t_y \end{bmatrix}$$

where x' and y' represent the template coordinates in frame N+1, the matrix with elements $a_{ij}$ defines scaling, rotation, and shearing of the point (x, y), and $t_x$ and $t_y$ provide translation.

Six affine parameters ($a_{11}$, $a_{12}$, $a_{21}$, $a_{22}$, $t_x$, $t_y$) define the parameter space for the global or local template. The affine deformation is performed in a steepest gradient descent in the parameter space by evaluating the template using the external energy image E. For example, using the chain rule, the equation below is derived, which advances $a_{11}$ by one iteration using a step size h:

$$a_{11}(n+1) = a_{11}(n) - h_a \frac{\partial E}{\partial a_{11}(n)}$$

$$= a_{11}(n) - h_a \left(\frac{\partial E}{\partial x'}\right)^T \frac{\partial x'}{\partial a_{11}(n)}$$

$$= a_{11}(n) - h_a \left(\frac{\partial E}{\partial x'}\right)^T x$$

$$\cong a_{11}(n) - h_a \left(\frac{\partial E}{\partial x'(n)}\right)^T x$$

where E is the energy, $h_a$ is the step size, n is the current iteration, and x, y and x',y' are the old and new positions due to the affine transformation. Similar equations, as follows, are derived for the other parameters:

$$a_{12}(n+1) \cong a_{12}(n) - \left(h_a \left(\frac{\partial E}{\partial x'(n)}\right)\right)^T y$$

$$a_{21}(n+1) \cong a_{21}(n) - \left(h_a \left(\frac{\partial E}{\partial y'(n)}\right)\right)^T x$$

-continued $$a_{22}(n+1) \cong a_{22}(n) - \left(h_a \left(\frac{\partial E}{\partial y'(n)}\right)\right)^T y$$

$$t_x(n+1) \cong t_x(n) - \left(h_t \left(\frac{\partial E}{\partial x'(n)}\right)\right)^T \cdot T$$

$$t_y(n+1) \cong t_y(n) - \left(h_t \left(\frac{\partial E}{\partial y'(n)}\right)\right)^T \cdot T$$

In the equations above, x represents the column vector of x coordinates for the entire contour (for global deformation) or a portion of the contour (for local deformation), and ∂E/∂x'(n) is the column vector containing the horizontal component of the gradient of the energy image at the boundary pixels. The energy image gradient is estimated using the central difference kernel [−1, 0, 1].

To initialize the template, the mean values, $x_c$ and $y_c$ are removed from the template vectors $x_0$ and $y_0$ and stored in x, y. Further the template centroid is stored ($x_c$, $y_c$). In addition, the parameters are set as follows to define an initial 2×2 identity matrix and zero translation: $a_{11}$=$a_{22}$=1; $a_{12}$=$a_{21}$=0; $t_x$=0; $t_y$=0.

In a preferred embodiment the gradient descent search is performed in two stages. In a first stage, a fixed number of iterations are performed using different fixed step sizes for the $a_{ij}$ and translation parameters. In one embodiment a ratio $h_t/h_{aij}$=1500 is used to ensure translation. In this first stage, the step sizes $h_t$ and $h_a$ are scaled inversely proportional to the number of points in the template. For example, $h_t$ 1/N and $h_a$ 1/N, where N is the number of points in the template. The step sizes are adjusted relative to the magnitude of the energy image, so in some embodiments emprical testing is performed. The gradient of the energy determines the direction of the step taken in the parameter space. However, due to the fixed step size, the template energy may increase or decrease between iterations, enabling the algorithm to climb hills to reach lower energy minima.

After updating the affine parameters in step 104 according to the equations above, the new external energy is calculated by summing the energy values at the new boundary points. At step 108 the minimum energy Emin is compared to the new external energy, Eext. If the minimum energy is greater than the external energy, then at step 110 the set Acurr of current affine parameters becomes the best set, Abest, of affine parameters. Also, at step 112 the minimum energy is set to the external energy. The process steps 104 through 112 are repeated for m iterations, where m is a prescribed value, and may vary by design. During an iteration, if the minimum energy is not greater than the external energy, the minimum energy value is not updated and the set of best affine parameters is not changed. At step 114, the iteration count is tested. If m iterations have not been completed then a new iteration commences. If the m iterations have completed, the set of best affine parameters, Abest, is used at step 116 to adjust the template border. Specifically, the current pixel values, x0, y0, are updated using the set of best affine parameters relative to the centroid value xc, yc.

The affine parameters describing the template with the lowest energy encountered during the first search stage are used to initialize the next stage. Such a gradient-guided search method is effective at finding the appropriate local energy minimum on the complex parametric surface.

The second stage includes a line search in the direction of the steepest gradient. On each iteration, an initial step size of 1.0 and an initial vector of $$(\hat{a}_{11}, \hat{a}_{12}, \hat{a}_{21}, \hat{a}_{22}, \hat{t}_x, \hat{t}_y) = \left( \frac{0.1 \cdot \frac{\partial E}{\partial a_{11}(n)} \cdot x}{\|\nabla G_a\|}, \frac{0.1 \cdot \frac{\partial E}{\partial a_{12}(n)} \cdot y}{\|\nabla G_a\|}, \right.$$

$$\frac{0.1 \cdot \frac{\partial E}{\partial a_{21}(n)} \cdot x}{\|\nabla G_a\|}, \frac{0.1 \cdot \frac{\partial E}{\partial a_{22}(n)} \cdot y}{\|\nabla G_a\|},$$

$$\left. \frac{2 \cdot \frac{\partial E}{\partial t_x(n)} \cdot T}{\|\nabla G_t\|}, \frac{2 \cdot \frac{\partial E}{\partial t_y(n)} \cdot T}{\|\nabla G_t\|} \right)$$

are used by the line search, where $\|\nabla G_a\|$ and $\|\nabla G_t\|$ are the maximum gradient magnitudes over the past and current iterations for the four $a_{ij}$ and two translation parameters, respectively. Once the direction of descent is selected, the line search finds K, the magnitude of the step to be taken in the direction of the gradient. typically, the line search produces a value K between 0 and 1. The affine parameters are then updated according to the following equations:

$a_{ij}(n+1) = a_{ij}(n) - K \cdot \hat{a}_{ij}$;

$t_x(n+1) = t_x(n) - K \cdot \hat{t}_x$ $t_y(n+1) = t_y(n) - K \cdot \hat{t}_y$

In a preferred embodiment the line search uses a line minimization function. The second stage is represented in a do while loop as follows:

```
Do {
    calculate new gradient direction
    execute line search
    update affine parameters
} While E(n+1) – E(n) < 0 (i.e., while the energy is decreasing)
```

Meritorious and Advantageous Effects

According to an advantage of this invention, an accurate boundary of an object is tracked for objects which deform or include rapidly moving sub-portions. The ability to track a wide variety of object shapes and differing object deformation patterns is particularly beneficial for use with MPEG-4 image processing systems.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for tracking an object among a plurality of image frames, comprising the steps of:

altering an initial template using a first set of deformation constraints and searching for a boundary of the object within a first spatial range of a first image frame of the plurality of image frames to coarsely locate the object within the first image frame, wherein a first deformed template is achieved from the initial template to coarsely locate the object;

deforming the first deformed template over a second spatial range using a second set of deformation constraints which are more relaxed than the first set of deformation constraints and searching for the boundary of the object to more accurately locate the object within the first image frame, wherein the second spatial range is narrower than the first spatial range, wherein a second deformed template is achieved from the first deformed template to more accurately locate the object; and in which the step of deforming the first deformed template using a second set of deformation constraints, comprises applying an affine transformation of the first deformed template, wherein the affine transformation is applied globally to the first deformed template, and the step of applying the affine transformation achieves an interim deformed template, and wherein the step of deforming the first deformed template using a second set of deformation constraints, further comprises applying a local affine transformation to a sub-portion of the interim deformed template to alter the sub-portion.

2. The method of claim 1, further comprising the step of deforming the second deformed template over a third spatial range using a third set of deformation constraints which are more relaxed than the second set of deformation constraints and searching for the boundary of the object to finely locate the object within the first image frame, wherein the third spatial range is narrower than the second spatial range, wherein a third deformed template is achieved from the second deformed template to finely locate the object, in which the third deformed template becomes the initial template for processing a second image frame of the plurality of image frames, and wherein each step recited in claim 1 is repeated for locating the object within the second image frame.

3. The method of claim 1, in which the step of altering the initial template using a first set of deformation constraints, comprises any one or more of translating, rotating and scaling the initial template.

4. The method of claim 1, in which the step of deforming the first deformed template using a second set of deformation constraints, comprises applying a local affine transformation to a boundary of a sub-portion of the first deformed template to alter the boundary of the sub-portion.

5. The method of claim 4, further comprising, prior to the step of deforming the initial template, the step of identifying an articulating portion of the object in an initial image frame, and defining a sub-portion of the initial template which corresponds to the articulating portion of the object.

6. A method for tracking an object among a plurality of image frames, comprising the steps of:

altering an initial template using a first set of deformation constraints and searching for a boundary of the object within a first spatial range of a first image frame of the plurality of image frames to coarsely locate the object within the first image frame, wherein a first deformed template is achieved from the initial template to coarsely locate the object;

deforming the first deformed template over a second spatial range using a second set of deformation constraints which are more relaxed than the first set of deformation constraints and searching for the boundary of the object to more accurately locate the object within the first image frame, wherein the second spatial range is narrower than the first spatial range, wherein a second deformed template is achieved from the first deformed template to more accurately locate the object; and in which the step of deforming the first deformed template using a second set of deformation constraints, comprises defining and updating a set of affine parameters;

using the updated set of affine parameters to test a boundary deformation of the first deformed template;

deriving an energy value for the boundary deformation being tested using the updated set of affine parameters;

testing the energy value against a minimum energy value;

when the minimum energy value is greater than the tested energy value, accepting the tested energy value as the minimum energy value and the set of affine parameters as a best set of affine parameters; and repeating the steps of defining, using, deriving, testing and accepting for a number of iterations resulting in one best set of affine parameters and one minimum energy value which are subsequently used to redefine said boundary.

7. The method of claim 6, in which the boundary deformation to test is a global boundary deformation.

8. The method of claim 6, in which the boundary deformation to test is a local boundary deformation of a sub-portion of the boundary of the first deformed template.

9. The method of claim 2, in which the step of deforming the second deformed template using a third set of deformation constraints comprises applying a local segmentation algorithm to deform the second deformed template within the third spatial range.

10. A method for tracking an object among a plurality of image frames, comprising the steps of:

selecting an object to be tracked;

defining a template from the selected object;

defining a boundary of sub-portion of the template which is smaller than the template;

calculating a set of affine parameters for the sub-portion boundary, the set of affine parameters corresponding to a first deformation of the sub-portion boundary;

using the set of affine parameters to test the first deformation of the sub-portion boundary, the step of using comprising:
  (i) deriving an energy value for the first deformation of the sub-portion boundary using the set of affine parameters;
  (ii) testing the energy value against a minimum energy value; and
  (iii) when the minimum energy value is greater than the tested energy value, accepting the tested energy value as the minimum energy value and the set of affine parameters as a best set of affine parameters;

repeating the steps of calculating and using for a number of deformations of the sub-portion boundary for a given image frame to be processed of the plurality of image frames, resulting in one best set of affine parameters and one minimum energy value which are subsequently used to redefine the sub-portion boundary.

11. The method of claim 10, further comprising the step of:

performing the steps of calculating, using and repeating for said plurality of image frames, in which the redefined sub-portion boundary for a given image frame among the plurality of image frames is used as the sub-portion boundary for which the set of affine parameters are calculated for a next image frame to be processed among the plurality of image frames.

12. The method of claim 10, further comprising the step of:

after the step of repeating applying a local segmentation algorithm to at least the redefined sub-portion boundary to estimate a location of a boundary of the object being tracked.

13. The method of claim 10, further comprising prior to the step of calculating, the step of adjusting an initial template corresponding to the selected object being tracked to coarsely estimate a location of the object being tracked in another image frame among the plurality of image frames, wherein the step of adjusting comprises any one or more of translating, rotating and scaling the initial template, including the sub-portion boundary.

14. A system for tracking an object among a plurality of image frames, comprising:

means for altering an initial template using a first set of deformation constraints and searching for a boundary of the object within a first spatial range of a first image frame of the plurality of image frames to coarsely locate the object within the first image frame, wherein a first deformed template is achieved from the initial template to coarsely locate the object;

means for deforming the first deformed template over a second spatial range using a second set of deformation constraints which are more relaxed than the first set of deformation constraints and searching for the boundary of the object to more accurately locate the object within the first image frame, wherein the second spatial range is narrower than the first spatial range, wherein a second deformed template is achieved from the first deformed template to more accurately locate the object;

wherein the means for deforming the first deformed template using a second set of deformation constraints, comprises means for applying an affine transformation to the first deformed template, in which the affine transformation is applied globally to the first deformed template, and the means for applying the affine transformation achieves an interim deformed template, and wherein the means for deforming the first deformed template using a second set of deformation constraints, further comprises means for applying a local affine transformation to a sub-portion of the interim deformed template to alter the sub-portion.

15. The system of claim 14, further comprising means for deforming the second deformed template over a third spatial range using a third set of deformation constraints which are more relaxed than the second set of deformation constraints and searching for the object to finely locate the object within the first image frame, wherein the third spatial range is narrower than the second spatial range, wherein a third deformed template is achieved from the second deformed template to finely locate the object;

in which the third deformed template becomes the initial template for processing a second image frame of the plurality of image frames, and wherein means for altering the initial template, the means for deforming the first deformed template and the means for deforming the second deformed template process the second image frame to track the object within the second image frame.

16. The system of claim 14, in which the means for altering the initial template using a first set of deformation constraints, comprises means for translating location of the initial template, means for rotating orientation of the initial template and means for scaling the initial template.

17. The system of claim 14, in which means for deforming the first deformed template using a second set of deformation constraints, comprises means for applying a local affine transformation to a boundary of a sub-portion of the first deformed template to alter the boundary of the sub-portion.

18. The system of claim 17, further comprising, means for identifying an articulating portion of the object in an initial image frame, and defining a sub-portion of the initial template which corresponds to the articulating portion of the object.

19. A system for tracking an object among a plurality of image frames, comprising:

means for altering an initial template using a first set of deformation constraints and searching for a boundary of the object within a first spatial range of a first image frame of and plurality of image frames to coarsely locate the object within the first image frame, wherein a first deformed template is achieved from the initial template to coarsely locate the object;

means for deforming the first deformed template over a second spatial range using a second set of deformation constraints which are more relaxed than the first set of deformation constraints and searching for the boundary of the object to more accurately locate the object within the first image frame, wherein the second spatial range is narrower than the first spatial range, wherein a second deformed template is achieved from the first deformed template to more accurately locate the object;

wherein the means for deforming the first deformed template using a second set of deformation constraints, comprises:

means for defining and updating a set of affine parameters;

means for using the updated set of affine parameters to test a boundary deformation of the first deformed template;

means for deriving an energy value for the boundary deformation being tested using the updated set of affine parameters;

means for testing the energy value against a minimum energy value;

means for accepting the tested energy value as the minimum energy value and the set of affine parameters as a best set of affine parameters when the minimum energy value is greater than the tested energy value;

wherein the means for defining, means for using, means for deriving, means for testing and means for accepting perform a number of iterations resulting in one best set of affine parameters and one minimum energy value which are subsequently used to redefine said boundary for a given image frame in which the object is being tracked.

20. The system of claim 19, in which the boundary deformation to test is a global boundary deformation.

21. The system of claim 19, in which the boundary deformation to test is a local boundary deformation of a sub-portion of the boundary of the first deformed template.

22. The system of claim 15, in which the means for deforming the second deformed template using a third set of deformation constraints comprises means for applying a local segmentation algorithm to deform the second deformed template within the third spatial range.

* * * * *